W. H. SMYTH.
MEANS FOR APPLYING FLUID METALS.
APPLICATION FILED DEC. 14, 1903.
975,731.
Patented Nov. 15, 1910.
4 SHEETS—SHEET 1.
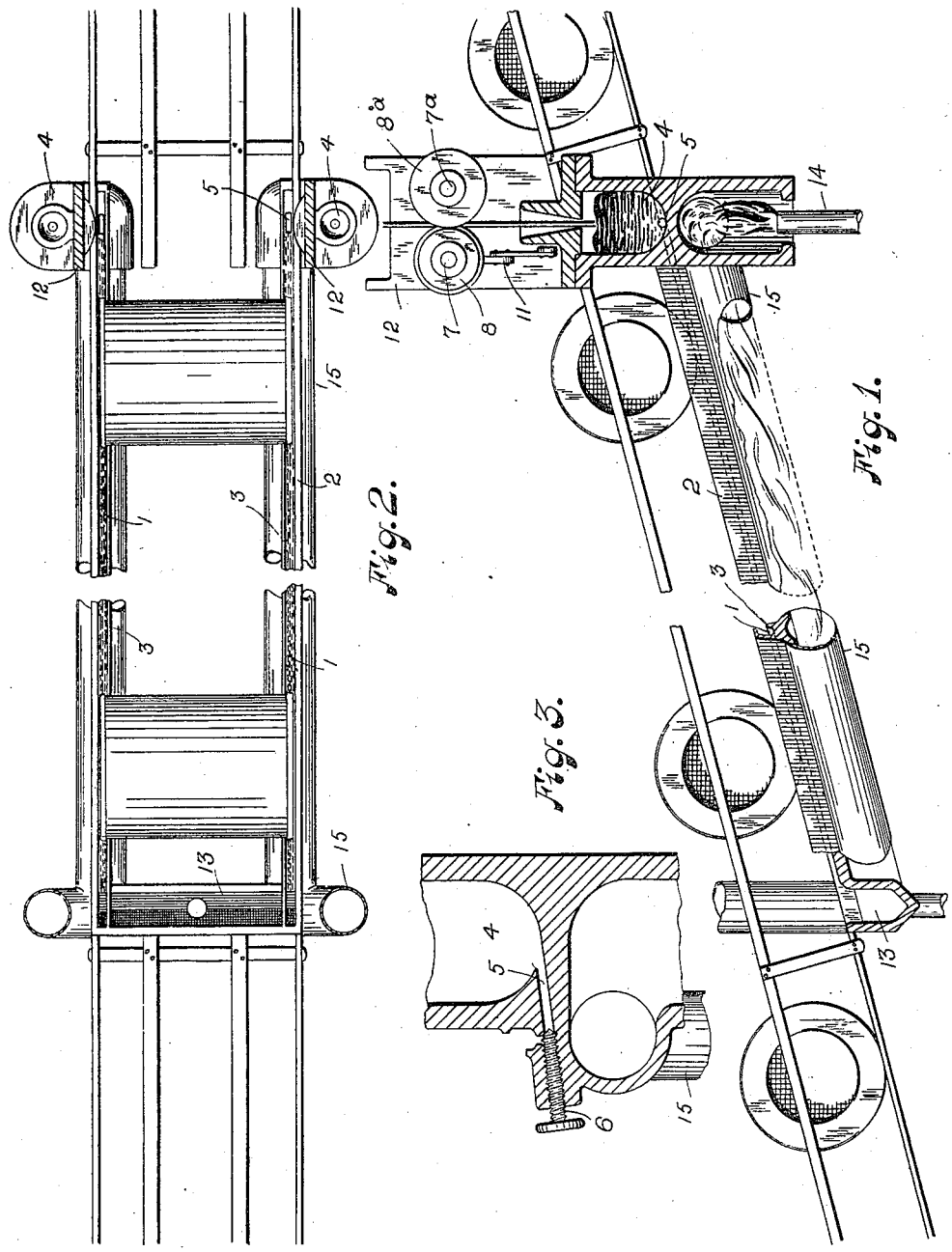
Witnesses:
Inventor:
William H. Smyth

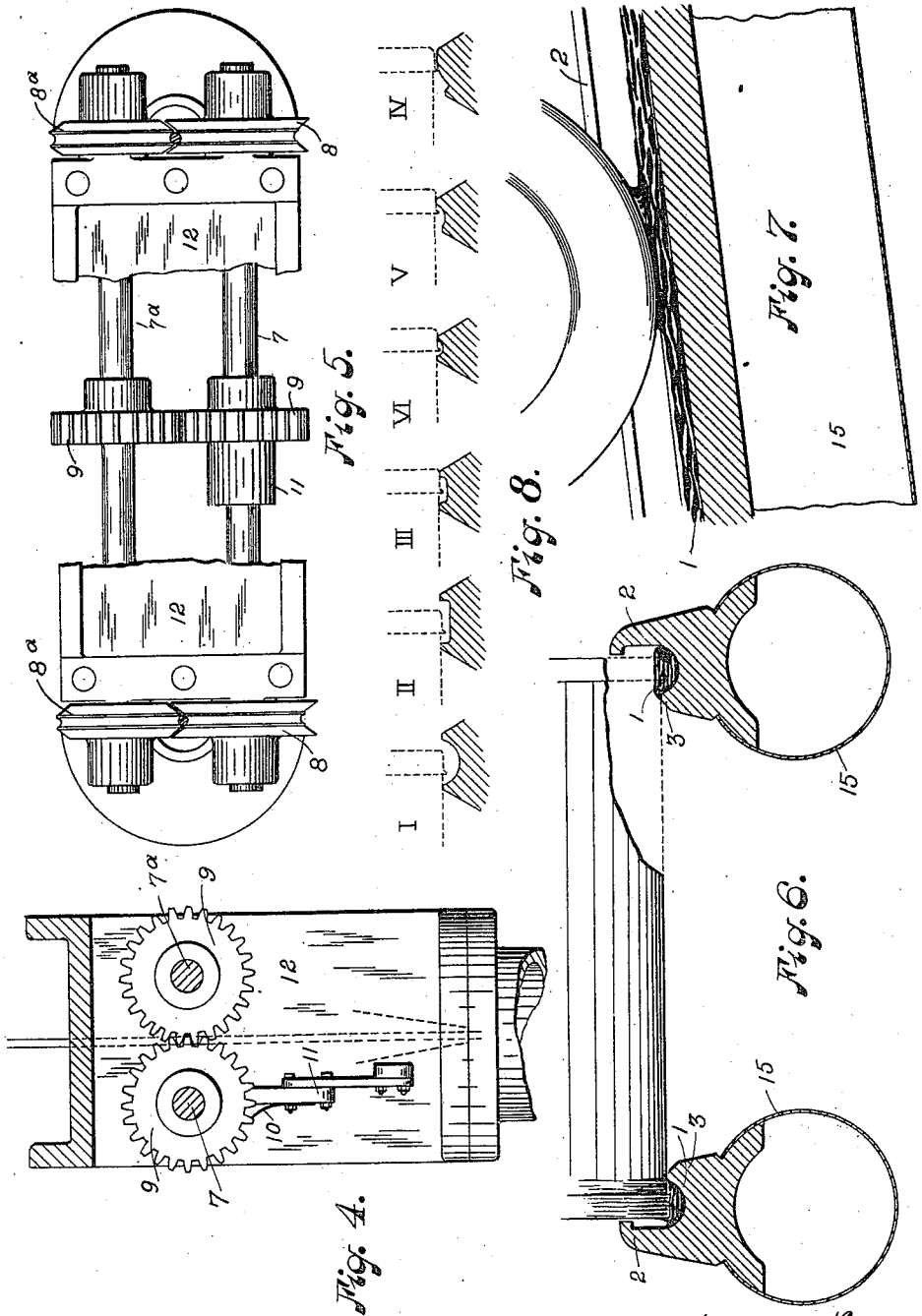

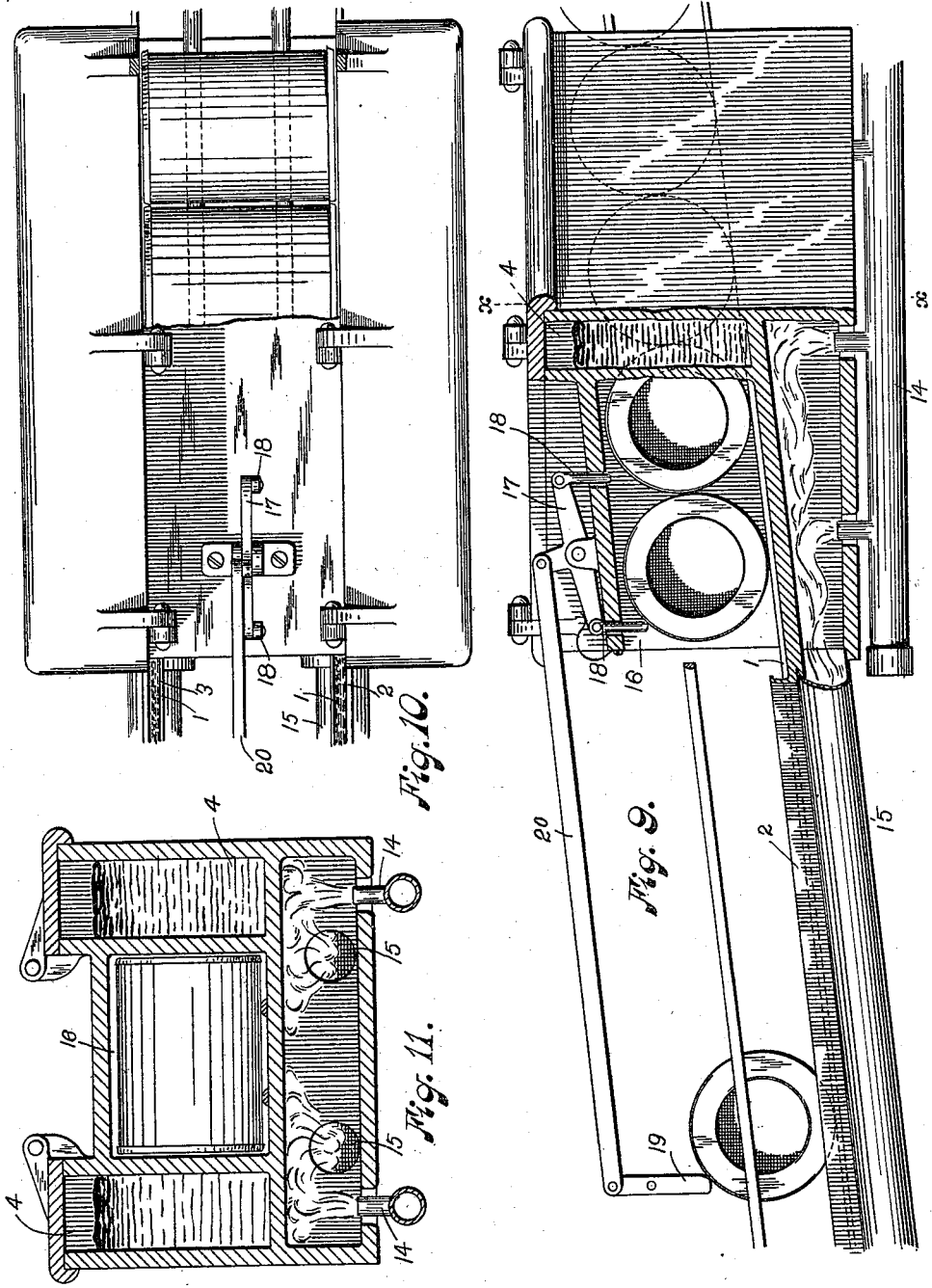

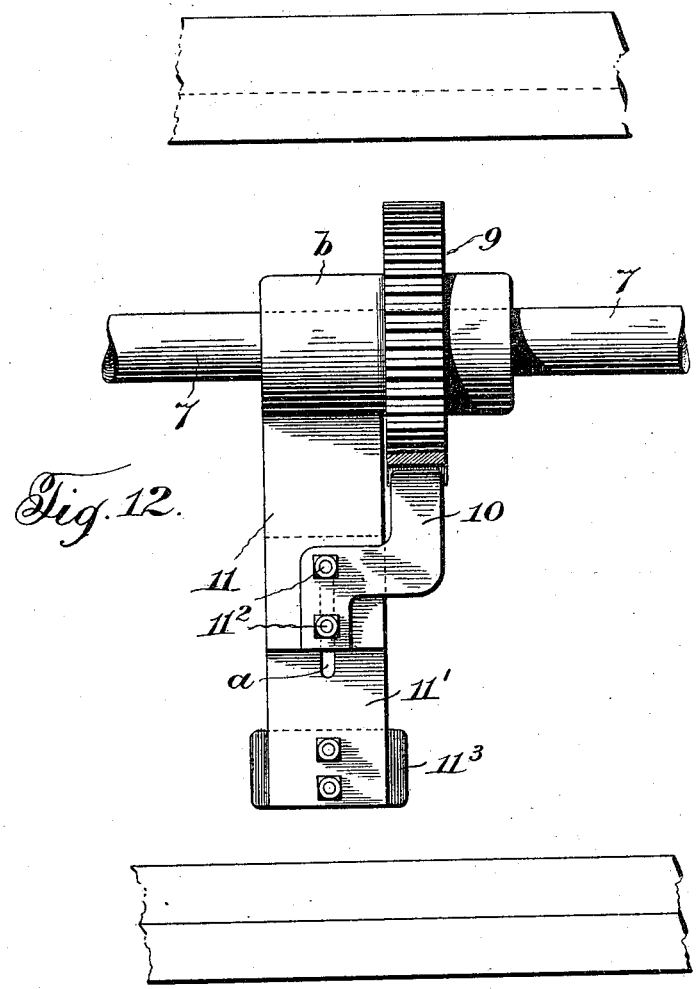

UNITED STATES PATENT OFFICE.

WILLIAM H. SMYTH, OF BERKELEY, CALIFORNIA.

MEANS FOR APPLYING FLUID METALS.

975,731. Specification of Letters Patent. Patented Nov. 15, 1910.

Application filed December 14, 1903. Serial No. 185,147.

*To all whom it may concern:*

Be it known that I, WILLIAM H. SMYTH, mechanical engineer, citizen of the United States, residing at Berkeley, in the county of Alameda and State of California, have invented certain new and useful Improvements in Means for Applying Fluid Metals; and I do hereby declare the following to be a full, clear, and exact description of the same.

This invention relates to improvements in means for applying fluid metal to objects.

There are in practice only a few broad and generic methods of utilizing fluid solder. These form categories into which the multitudes of machines differing mechanically may be classified. Thus there are machines employing stationary fluid metal against or in which the object to be soldered is moved. In this class belong the great majority of the machines at present employed. Others again, employ the flow of fluid metal and apply the object to the flow. Still others, by mechanically moving devices, such as disks and plows, etc., raise a limited portion of the surface or mound above the normal level in contact with the object to be soldered. The present device comes within none of these classes, though it employs flowing solder. For it utilizes in addition to flowing solder a principle or law of fluids not heretofore utilized for applying solder so far as I am aware, namely:—capillary action "according to which the fluids rise above or sink away from their level about the sides of the containing vessel."

The device of the present disclosure therefore illustrates a new type of machine and an application of fluid capable of being applied to many other uses than soldering of cans.

By the utilization of the principles mentioned, there is brought about a machine of exceedingly simple character inasmuch as no motive force other than gravity is necessary to effect its operations.

I therefore claim this invention, broadly, unrestricted to any particular form or detail of construction.

Each of the prior classes of devices referred to have inherent defects, limitations and objections. Some of these are:—In connection with the stationary-solder bath machine, the practical necessity of providing a large volume of molten solder, the surface of which becomes oxidized. This requires constant attention, to remove by skimming or otherwise the thus accumulated oxid. Another and still greater defect in this type of machine is that in the soldering of heads of cans, it is necessary to immerse a considerable portion of the can beneath the surface of the solder. It is thus impossible to solder both ends simultaneously as the axis of the can must be at an angle to the surface of the solder. It is also, due to the same cause, extremely wasteful of solder for as the can is dipped angularly into the solder, the solder flows into the interior of the can. This it does whenever the head joint is in anyway imperfect. A large proportion of the solder used is wasted in this manner. In this method of applying solder also, the can invariably picks up a much larger amount of solder than is necessary. Means are usually provided to remove the surplus solder. These generally take the form of wipers or brushes, which besides adding complication to the machine, displace and knock off many of the heads. All these defects are sources of loss both in time and material.

In the moving-solder bath machines, complicated machinery and appliances are necessary to give motion to and control the solder, which also owing to the volume of molten solder and its agitation is subject to great waste from oxidation. This type of machine is subject also to the waste incident to the application of an unnecessary amount of solder as described in connection with the stationary solder machines.

Many of the defects noted in relation to the two previous types are present also in the class of machines in which the surface of the solder is mounded, though in a less degree. In all these machines and in all others with which I am familiar, for the automatic soldering of cans, the manipulation of the solder and cans involves complicated moving parts to effect handling of the cans and other functions of the machines.

The object of the invention may therefore be stated to be, to overcome the stated difficulties and provide more simple, rapid, efficient and economical means of applying fluids to objects.

From my knowledge of the subject, I have arrived at the conclusion that ideally economically soldering of cans or the like involves the following procedure or steps:— 1.—Heating of the cans to avoid chilling of the solder. 2.—The application of an abundance of solder to permit thorough sweating of the solder into the joint. 3.—Removal of the excess of solder to the greatest possible degree. 4.—That both heads be operated upon simultaneously. 5.—The using, heating and manipulation of the least possible amount of solder consistent with other requirements, in order to economize fuel. 6.—The least possible agitation and exposure of the solder to atmospheric influence to avoid oxidation. 7th.—That in all of these operations, and this especially applies after the can has received its solder, the can be not subjected to jars or shocks which tend to disturb the head.

Another object therefore of the present invention is to carry into effect the enumerated operations under the stated conditions.

In carrying into effect the operations, I preferably employ gravity to advance the cans and effect the solder flow, capillary action to effect the contact of the solder with the can and the gravity of the fluid solder on the can in conjunction with the natural adhesion of solder to a solder-wet surface to rob the can of surplus solder during its rolling progress.

The device comprises, stated generally and in connection with what has already been said of an open gravity conduit or trough down which the fluid metal may flow, a guide-way for the cans or other objects longitudinally of the solder flow whereby the object is guided in contact with the solder and a heating device for the solder and cans.

It also consists in the novel combinations and constructions hereinafter described and claimed.

I will describe one characteristic form with modifications, whereby my invention may be carried into effect in the soldering of heads on cans in the process of their manufacture. From this disclosure, skilled mechanics may readily adapt this invention to other purposes and forms than those shown in the accompanying illustrations.

In the drawings:—Figure 1 shows an elevation of the device, parts being in section. Fig. 2 shows a plan of the device made double for soldering both ends of the can simultaneously. Fig. 3 shows a sectional detail of the solder cup on enlarged scale, Fig. 4 shows a detail on an enlarged scale of the solder feeder in elevation. Fig. 5 is a plan view of Fig. 4 with parts broken away to more clearly illustrate it. Fig. 6 shows a transverse section of the solder troughs on an enlarged scale. Fig. 7 shows a section of a portion of one of the troughs on an enlarged scale to illustrate the action of the solder on a rolling can. Fig. 8 shows in diagrammatic form, sections of the solder trough at various points along its length. Fig. 9 shows a detail relating to the heating and feeding of the cans. Fig. 10 is a plan view of a portion of Fig. 9. Fig. 11 is a cross section through line X X of Fig. 9. Fig. 12 is a side view of the mechanism illustrated in Fig. 4, from the left side of said figure.

Referring to the drawings, 1 is a shallow open trough for solder slightly wider than the can head, down which the cans and solder may run. Its outer wall 2 may extend upward and inward to form a side wall of the runway for the cans and its inner wall 3 determines the depth of the trough and its upper edge, which is tinned, acts as a track to support the rolling cans.

The trough 1 may be of uniform section throughout but I prefer to make it of varying sections as shown in the series of diagrams Fig. 8, for this latter form effects a large economy in the solder as will be noted more particularly later in the description of the operation. The solder supply 4 may be of any suitable character and may contain sufficient molten solder for a long run as shown in Fig. 9 or the supply may be reduced to a small cup as shown in Figs. 1, 2, and 3. By employing the small supply, less heat is employed in keeping the solder hot. The supply 4 in any case is preferably of sufficient capacity to provide a regular unintermittent flow of solder. The supply is provided with an aperture 5 of suitable size opening into the trough 1. This aperture may be provided with a controlling valve 6 which may be operated automatically, or by hand as shown in Fig. 3.

When a small solder cup is employed, it is desirable to provide means for keeping it constantly supplied with solder. For this purpose I have shown an automatic wire solder feeder which consists of transverse shafts 7—7$^a$ provided with feed rolls 8—8$^a$ adapted to rotate in contact with the wire. The shafts 7—7$^a$ are geared together by gears 9 to work in unison in opposite directions. A pawl 10 adapted to engage with the teeth of gear 9 is attached to a swinging arm, which hangs down in the path of the rolling cans and which is composed of sections 11, 11′ adjustably secured together by clamping bolts 11$^2$; the lower section 11′ being provided with an elongated slot $a$ for the passage of the bolts. The section 11 is provided at its upper end with a sleeve $b$, which loosely encircles the shaft 7 adjacent the gear 9. Detachably connected to the lower end of section 11′ in any suitable manner is a wear plate 11$^3$ provided for direct contact with the rolling cans. The solder feeder is mounted in a suitable frame 12, all of which is shown in Figs. 4 and 12.

At the lower end of the trough 1 may be provided a conduit or receptacle 13 adapted to catch solder from the trough 1 should a greater amount flow than the cans take up.

A suitable burner or heating device 14 is provided beneath the solder supply. Extending beneath the solder trough 1 is a flue 15 which conveys the heat from the burner 14.

The foregoing description has had reference to one trough, but it is apparent that by duplicating the devices just described, at a suitable distance apart, both ends of the can will be operated upon simultaneously, as shown in Figs. 2, 6 and 10.

In order to pre-heat the cans, I provide a chamber or tunnel 16 preferably heated by the waste heat from the burners and the molten solder. Where a comparatively large volume of molten solder is used, this heating chamber is very satisfactorily constructed by having the solder supply extend along each side of a portion of the can run-way as shown in Figs. 9, 10 and 11.

Though the cans may be fed without regard to order, I prefer to arrange so that they will feed individually along the solder trough. To effect this end, I provide a feeding escapement device by means of which any desirable interval or distance between each can may be produced. This escapement consists in a rocking double bell-crank lever 17 having depending ends 18 and mounted above the path of the cans. A hanging lever 19 also in the path of the cans some little distance in advance is provided. These levers 17 and 19 are connected by a rod 20.

In operation, the solder being permitted to flow into the troughs in sufficient quantity to fill them, the solder will mound above the upper surface of the inner wall 3 by capillary action so that the upper surface of the flowing solder is always slightly above the wall 3 at the beginning of the trough, as shown in the right hand side of Fig. 6. Fluxed cans being now admitted to the runway, they may pass directly to the solder troughs or if pre-heating and space intervals between the cans is deemed desirable, they will be held in the heating chamber by the action of the escapement. When sufficiently heated, the first can is liberated. This can liberates the second by contact with the depending lever 19 and thereafter each can liberates the succeeding can. The head and a narrow band of the body on each end of each can comes in contact with the solder during the rolling travel and picks the solder up as shown in Figs. 6 and 7. The cans may be permitted to travel with considerable speed. This is advantageous on account of the tendency of the molten solder to seek the greatest diameter owing to centrifugal action. The inner edge of the can head is the greatest diameter and the place where it is most desirable for the solder to accumulate. The inturned edge of the wall 2 acts as a scraper to remove surplus solder and return it to the trough.

As each can comes to the solder troughs, it meets the depending arm 11 which it swings forward partially rotating the shafts 7 and 7ª and so feeding a determined quantity of solder wire into the cup 4. The amount of this feed may be regulated with sufficient accuracy by the lengthening and shortening of the swinging arm 11.

The flow of solder may be proportioned so that no more solder is permitted to flow into the trough than is used up by the cans, though this is not essential. It is desirable however that the depth of the trough be so proportioned that during the latter portion of the cans travel, the cans roll out of contact with the solder. During this part of the travel, the edge 3 will rob the can of the surplus solder owing to the adhesion of the molten solder on the can to the bearing edge 3. This action has a peculiarly beneficial effect as it causes the surplus solder accumulating on the head to flow across the joint of the head with the body and thus permit a good sweating action into the joint while constantly removing unnecessary solder. This removal or robbing of surplus solder may be extended by suitably forming the contour of the trough and its edges as shown in Fig. 8.

Diagram I shows the form of the trough at its beginning and this extends for sufficient distance to permit the can head to get thoroughly supplied with solder and the solder to be sweated into the joint. Diagram II shows the depth of the trough reduced as the solder diminishes owing to its removal by the can. Diagram III shows the area of the trough still more reduced by narrowing its width till the outer edge comes beneath the can head. This has the effect of taking the solder from the can head. Diagram IV shows a still greater narrowing and contracting of the supporting edges whereby the solder is taken from both can body and head. Diagram V shows the inner edge of this section withdrawn from the can body and the solder continues to be removed from the head. Diagram VI shows the support in this section transferred to the flared edge of the can head and the last remnant of surplus solder removed therefrom.

Of course during the whole of the above described operation, from the time the solder is applied to the can, notwithstanding the rolling of the can, the solder, owing to its fluidity and the action of gravitation, is flowing toward the bottom of the can and accumulating at the lowest point. This materially assists in the removal of the surplus solder.

As the solder is constantly in motion and is used up as fast as fed, no accumulation of oxid can take place, thus a clean bright surface of solder is always presented to the can and skimming or cleaning the surface is wholly dispensed with and the lack of economy incident thereto, is obviated.

For the soldering of heads of round cans, no motor mechanism is required, as both cans and solder may travel by gravity. As the can rolls freely and smoothly through the device and no brush or other wiper is applied to the can, either before or after it has been soldered, there is nothing to cause the heads to be jarred off. The side seams of cans may be soldered in the same manner or solder or other fluids may be applied to surfaces in strips of limited widths by the same character of means. For effecting the travel of flat or irregular shaped objects, any of the ordinary appropriate means heretofore employed for effecting the travel of devices such as chains, ropes, etc., may be employed, these however are so well known to mechanics that they need not here be more fully described.

Though I have shown a valve 6 to control the flow of solder from supply 4, this is not necessary. Considerable latitude is permissible in the amount of solder flowing down the troughs. Thus the aperture 5 may be made with sufficient accuracy as to capacity for all practical purposes without any controlling device. The adjustability of arm 11 also gives control over the amount of solder fed to the cups.

Any of the ordinary means for fluxing the cans may be employed or a device substantially similar to the present, without the heating device, may be used to apply flux to the cans.

What I claim is:—

1. A guideway suitably arranged to effect the travel of a can or the like, a solder trough arranged to effect the longitudinal flow of fluid therein, in contact with the traveling can.

2. A guideway suitably arranged to effect the travel of a can or the like, solder troughs arranged to effect the longitudinal flow of solder therein, in contact simultaneously with both cover joints of the can.

3. A guideway suitably arranged to effect the rolling travel of a can or the like, a solder trough arranged to effect the longitudinal flow of solder therein, in contact with the traveling can.

4. A guideway suitably arranged to effect the rolling travel of a can or the like, solder troughs arranged to effect the longitudinal flow of solder therein, in contact simultaneously with both cover joints of the can.

5. A device for applying fluid metals to cans or the like comprising gravity means adapted to effect the travel of cans and fluid metal in contact with each other whereby the fluid is applied to the can.

6. A device comprising gravity means adapted to effect the travel of cans or the like and fluid metal in contact with each other, whereby the fluid is applied to both ends of the cans simultaneously.

7. A device comprising means adapted to effect the travel of cans or the like, and means adapted to effect the flow of fluid longitudinally parallel to the path of travel of the cans in contact with both ends of the cans simultaneously.

8. A gravity runway for cans and a gravity trough for solder whereby the solder flows in contact with the cans.

9. A gravity runway for cans and a gravity trough for solder whereby the solder flows in contact with both cover joints of the can simultaneously.

10. Means adapted to effect the travel of cans or the like and a gravity trough for solder whereby the solder flows longitudinally in contact with the cans.

11. Means adapted to effect the rolling travel of cans or the like and a gravity trough for solder whereby the solder flows longitudinally in contact with the cans.

12. Means adapted to effect the travel of cans or the like and a gravity trough for solder whereby the solder flows longitudinally in contact with both cover joints of the cans simultaneously.

13. Means adapted to effect the rolling travel of cans or the like and a gravity trough for solder whereby the solder flows longitudinally in contact with both cover joints of the can simultaneously.

14. A stationary guideway adapted to effect the travel of a can or the like, a solder trough arranged to effect the longitudinal flow of fluid therein, in contact with the traveling can and automatic means adapted to regulate the solder feed.

15. A device comprising stationary means adapted to effect the travel of cans or the like, a conduit for fluid metal paralleling the path of the cans, means adapted to effect the flow of fluid longitudinally of the path of the cans in contact therewith and automatic means adapted to regulate the amount of the fluid feed.

16. A device comprising gravity means adapted to effect the travel of cans or the like and fluid metal in contact with each other, whereby the fluid is applied to the can and automatic means adapted to regulate the amount of the fluid feed.

17. A device comprising stationary means adapted to effect the travel of cans or the like and means adapted to effect the flow of fluid in contact therewith and automatic means adapted to regulate the amount of the fluid feed.

18. A gravity runway for cans or the like and a gravity trough for solder whereby the solder flows in contact with the cans and automatic means adapted to regulate the feed of solder.

19. A device for operating on cans or the like comprising a gravity runway for cans, a device in the path of the traveling cans adapted to effect the release of a can by contact with a preceding can while the latter is traveling by gravity.

20. A device for operating on cans or the like including means to effect the travel of cans by gravity, and means operated by a gravity influenced rolling can to effect the release of another can.

21. A device for operating on cans or the like comprising a gravity runway for cans, a device in the path of the traveling cans adapted to effect the release of a can by contact with a perceding can while the latter is traveling by gravity and means for soldering the can.

22. A device for operating on cans or the like including means to effect the travel of cans by gravity, means operated by a gravity influenced rolling can to effect the release of another can, and means for soldering the cans.

23. A soldering machine comprising a bath of flowing solder, means adapted to effect the travel of a can or the like in contact therewith and means operated by the traveling cans adapted to regulate the solder feed.

24. A device comprising gravity means adapted to effect the travel of cans or the like and solder in contact with each other whereby the solder is applied to the cans and stationary means adapted to remove the surplus solder from the cans.

25. A soldering machine consisting of an open gravity trough adapted to apply solder to objects and remove the surplus therefrom.

26. A soldering machine comprising gravity means adapted to apply solder to rolling cans and stationary tracks upon which the cans roll with their solder coated parts in contact with said tracks whereby the surplus solder is removed.

27. A soldering machine consisting of an open longitudinal trough of varying cross-section in its length, the upper surface or edges being adapted to support a rolling can and remove the surplus solder therefrom.

28. A soldering machine consisting of an open longitudinal trough of varying cross section in its length adapted to apply solder to a rolling can and remove the surplus solder therefrom.

29. A soldering machine consisting of an open longitudinal trough and a continuation thereof forming a supporting runway for cans adapted by contact therewith to remove the surplus solder.

30. In a fluid solder machine for cans or the like, a preheating chamber to heat the cans prior to the application of solder thereto and adapted to contain a multiplicity of cans, receptacles for solder adjacent the walls of said preheating chamber, and means for applying heat to said solder receptacles.

31. In a device for applying fluid solder to cans or the like, a heated chamber adapted to receive and retain a multiplicity of cans whereby heat is applied thereto prior to the application of solder.

32. In a fluid solder machine for cans or the like, a preheating chamber adapted to contain a multiplicity of cans and automatic means adapted to release a succession of single cans therefrom.

33. A device consisting of an open solder-conduit, and means for heating the same, means adapted to effect the solder flow longitudinally thereof and means adapted to apply cans or the like to and in contact with the longitudinally flowing solder.

34. A device consisting of an inclined open conduit adapted to effect the flow of solder therein, means for heating the same and means adapted to apply cans or the like to the flowing solder.

35. A device consisting of an open solder-conduit, and means for heating the same, means adapted to effect the solder flow longitudinally thereof and means adapted to support and guide a rolling can or the like above said conduit and in contact with the longitudinally flowing solder whereby solder is applied to the can.

36. A device consisting of an inclined open conduit adapted to effect the flow of solder therein, means for heating the same and means adapted to support and guide a rolling can or the like above said conduit whereby solder is applied to the can.

37. A device consisting of an open solder-conduit, and means for heating the same, means adapted to effect the solder flow longitudinally thereof and gravity means adapted to apply cans or the like to and in contact with the longitudinally flowing solder.

38. A device consisting of an inclined open conduit adapted to effect the flow of solder therein, means for heating the same and gravity means adapted to apply cans or the like to the flowing solder.

39. A device consisting of an open solder-conduit and means for heating the same, means adapted to effect the solder flow longitudinally thereof and gravity means adapted to effect the travel of a rolling can or the like above the conduit and in contact with the longitudinally flowing solder whereby solder is applied to the can.

40. A device consisting of an inclined open conduit adapted to effect the flow of solder therein, means for heating the same, and gravity means adapted to effect the travel of a rolling can or the like above the conduit whereby solder is applied to the can.

41. A solder applying device comprising a combined gravity solder conduit and runway for cans or the like adapted to effect the longitudinal travel of the solder and cans in contact with each other.

42. A device comprising a combined gravity solder conduit and runway for cans or the like adapted to effect the longitudinal travel of the solder and cans in contact with each other and remove the surplus.

43. A device for applying solder circumferentially to both cover joints of a can simultaneously, consisting of a multiplicity of open solder conduits forming a gravity runway for cans.

44. A device comprising a combined gravity solder conduit and runway for cans or the like adapted to effect the longitudinal travel of the solder and cans in contact with each other whereby solder is applied circumferentially to both cover joints of a can simultaneously and remove the surplus therefrom.

WILLIAM H. SMYTH.

Witnesses:
Wm. K. White,
Jesse R. Eoff.